United States Patent
Hwang et al.

(10) Patent No.: US 9,865,286 B2
(45) Date of Patent: Jan. 9, 2018

(54) TAPE ARRAY ELECTRICAL LAPPING GUIDE DESIGN FOR SMALL STRIPE TMR SENSOR

(71) Applicant: HGST Netherlands B.V., Amsterdam (NL)

(72) Inventors: Cherngye Hwang, San Jose, CA (US); David John Seagle, Morgan Hill, CA (US); Diane L. Brown, San Jose, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 15/169,589

(22) Filed: May 31, 2016

(65) Prior Publication Data

US 2017/0345451 A1 Nov. 30, 2017

(51) Int. Cl.
*G11B 5/48* (2006.01)
*G11B 21/21* (2006.01)

(52) U.S. Cl.
CPC ............ *G11B 5/4826* (2013.01); *G11B 21/21* (2013.01)

(58) Field of Classification Search
CPC ................................ G11B 5/4826; G11B 21/21
See application file for complete search history.

(56) References Cited

U.S. PATENT DOCUMENTS

| | | | | |
|---|---|---|---|---|
| 4,219,853 A | * | 8/1980 | Albert | G11B 5/3103 29/603.12 |
| 5,065,483 A | * | 11/1991 | Zammit | G11B 5/3166 29/603.09 |
| 5,494,473 A | * | 2/1996 | Dupuis | B24B 37/048 29/603.09 |
| 6,195,871 B1 | * | 3/2001 | Watanuki | B82Y 10/00 29/603.09 |
| 6,609,948 B1 | | 8/2003 | Fontana, Jr. et al. | |
| 7,016,143 B2 | | 3/2006 | Kirschenbaum et al. | |
| 7,116,519 B2 | * | 10/2006 | Koeppe | G11B 5/127 360/121 |
| 7,551,406 B1 | * | 6/2009 | Thomas | G11B 5/102 360/317 |
| 7,554,767 B1 | * | 6/2009 | Hu | B24B 49/10 29/603.16 |
| 7,564,110 B2 | | 7/2009 | Beach et al. | |
| 7,643,250 B2 | * | 1/2010 | Araki | G11B 5/3166 360/234.5 |
| 7,681,303 B2 | * | 3/2010 | Kondo | G11B 5/1278 29/603.09 |
| 7,963,023 B2 | | 6/2011 | Lau | |
| 8,361,541 B2 | | 1/2013 | Lee et al. | |

(Continued)

*Primary Examiner* — Brian Miller
(74) *Attorney, Agent, or Firm* — Foley & Lardner LLP

(57) ABSTRACT

A magnetic tape recording module having electrical lapping guides located within and adjacent to an array of magnetic read/write elements. Electrical leads connected with the electrical lapping guides are buried deep within the head build, close to the substrate so that they can pass beneath the electrical leads of the read/write elements without any capacitive coupling between the electrical lapping guide leads and the read/write element leads. The presence of the electrical lapping guides within and adjacent to the read/write element leads provides much more accurate control of read/write element stripe height during lapping.

18 Claims, 5 Drawing Sheets

(56) References Cited

U.S. PATENT DOCUMENTS

| | | | | |
|---|---|---|---|---|
| 8,407,882 B2* | 4/2013 | Seki | ............... | G11B 5/3166 |
| | | | | 29/603.12 |
| 8,739,391 B2* | 6/2014 | Childress | ............ | G11B 5/6082 |
| | | | | 29/737 |
| 8,956,201 B2* | 2/2015 | Druist | ............... | B24B 37/005 |
| | | | | 451/1 |
| 9,093,087 B2* | 7/2015 | Biskeborn | ......... | G11B 5/00826 |
| 9,153,260 B1* | 10/2015 | Rudy | ............... | G11B 5/3166 |
| 9,321,146 B1* | 4/2016 | Rudy | ............... | B24B 49/10 |
| 9,361,916 B1* | 6/2016 | Chung | ............ | B24B 37/048 |
| 2006/0168798 A1 | 8/2006 | Naka | | |
| 2007/0230056 A1* | 10/2007 | Beach | ............. | G11B 5/6005 |
| | | | | 360/234.5 |
| 2012/0036706 A1* | 2/2012 | Lau | ............... | G11B 5/1278 |
| | | | | 29/603.01 |

\* cited by examiner

TAPE ARRAY ELECTRICAL LAPPING GUIDE DESIGN FOR SMALL STRIPE TMR SENSOR

FIELD OF THE INVENTION

The present invention relates to magnetic data recording and more particularly to a slider design for magnetic tape recording that provides for better stripe height control during manufacture.

BACKGROUND

Magnetic tape data storage cartridges and the magnetic tape data storage drives which read and write data to magnetic tape data storage cartridges are typically reliable means of providing long term storage of information. The magnetic tape drive system can include a slider which may have many read/write elements formed thereon. These many read/write elements can read multiple data tracks on a single magnetic data tape. During manufacture of the slider, a lapping process can be used to define the stripe height of the magnetic read/write elements formed on the slider. The lapping (and associated read/write element stripe heights) can be monitored and controlled by electrical lapping guides to determine when lapping should be terminated.

SUMMARY

The present invention provides a slider for magnetic data recording that includes a slider body, a plurality of magnetic read/write elements formed on the slider body and a plurality of electrically conductive read/write element leads connected with the plurality of read/write elements. A plurality of electrically conductive electrical lapping guide leads are also formed on the slider body. At least a portion of the electrically conductive electrical lapping guide leads are formed at a different level on the slider body than are the plurality of electrically conductive read/write elements leads.

At least a portion of an electrical lapping guide can be electrically connected with at least one of the plurality of electrical lapping guide leads. The electrical lapping guide can be located in a region near the plurality of read/write elements, and can include a lapping guide located within an array of the plurality of read/write elements and electrical lapping guides located at outer ends of the array of read/write elements.

The electrical lapping guide leads can be buried deep in the head build, close to the substrate, whereas the read/write element leads can be located at the top of the head build away from the substrate. This allows the electrical lapping guide leads to pass beneath the read/write element leads without adding any capacitive interference. This advantageously allows the electrical lapping guides to be located in the region of the array of magnetic read/write elements so that the lapping and associated stripe height can be more accurately controlled. The electrical lapping guides and electrical lapping guide leads can be left in the finished slider without any negative effect on signal performance.

These and other features and advantages of the invention will be apparent upon reading of the following detailed description of the embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
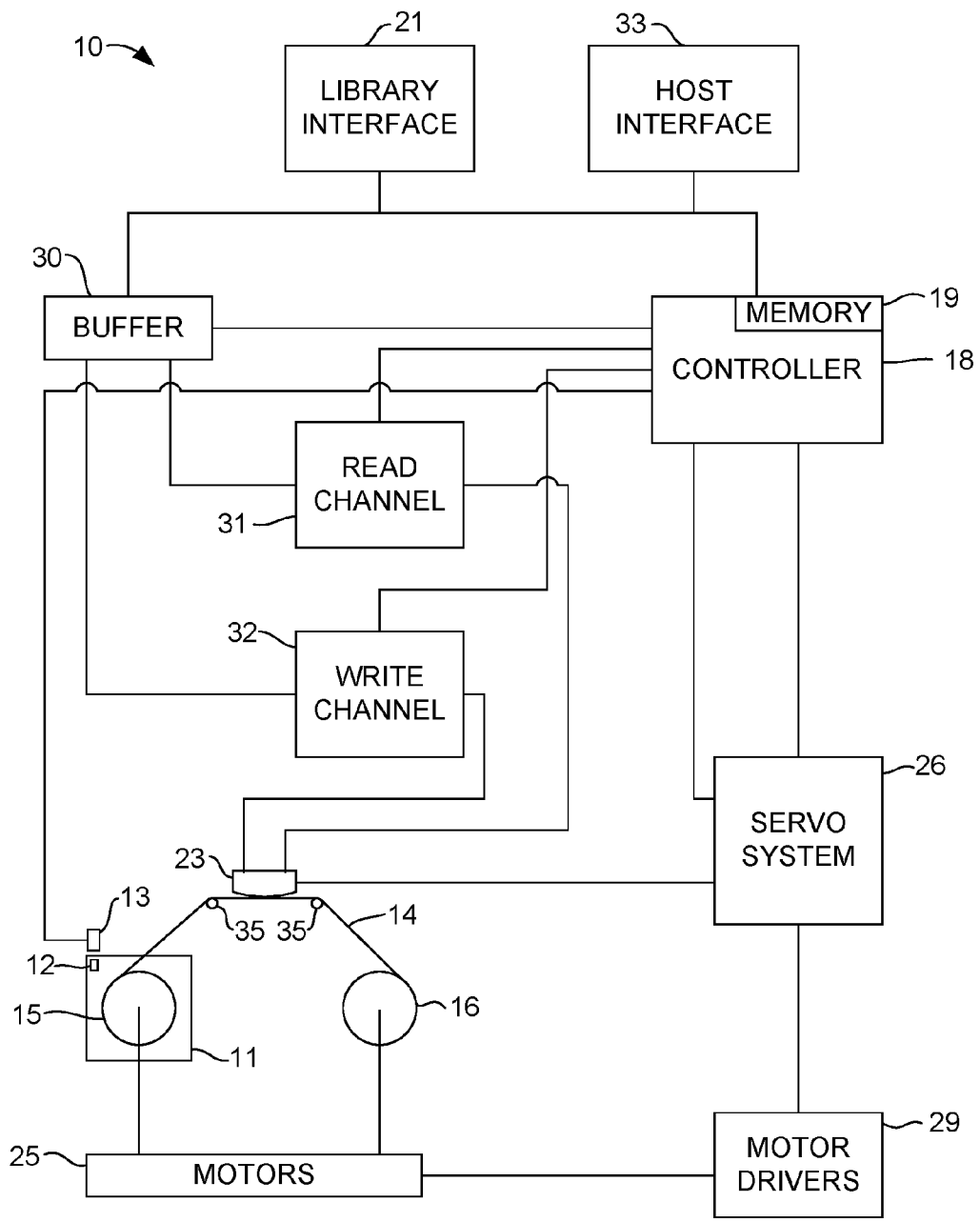
FIG. 1 is a schematic illustration of a magnetic tape drive data recording system in which the invention might be embodied.

With reference to FIG. 1, a schematic illustration of a magnetic tape data storage system 10 is illustrated. The magnetic tape data storage drive 10 provides a means for reading and writing information with respect to a magnetic tape 14 of a magnetic tape data cartridge 11.

Magnetic tape data storage cartridges provide a means to store data on magnetic tape to be saved and read at a subsequent time. Further, the magnetic tape data storage cartridges may be interchanged between tape drives, such that a magnetic tape written on one tape drive can be read by another tape drive.

As will be understood by those skilled in the art, a magnetic tape data storage cartridge 11 comprises a length of magnetic tape 14 wound on one or two reels 15, 16. A single reel magnetic tape data storage cartridge 11 is illustrated, examples of which are those adhering to the Linear Tape Open (LTO) format.

A magnetic tape data storage drive 10 can include one or more controllers 18 of a recording system for operating the magnetic tape drive in accordance with commands received at library interface 21 or host interface 33. A controller typically includes logic and/or one or more microprocessors with a memory 19 for storing information and program information for operating the microprocessor. Herein, "processor" may comprise any suitable logic, microprocessor, and associated memory for responding to program instructions, and the associated memory may comprise fixed or rewritable memory or data storage devices. The program information may be supplied to the controller or memory via the interface 21, via the interface 33, or by being read from a magnetic tape cartridge 11, or by any other suitable means. The magnetic tape data storage drive 10 may comprise a stand-alone unit or comprise a part of an automated data storage library or other sub-system. The magnetic tape data storage drive may be coupled to the host system directly, through a library, or over a network, and may employ as interfaces 21 and/or 33 a Small Computer System Interface (SCSI), an optical fiber channel interface, etc.

The magnetic tape data storage cartridge 11 may be inserted into the magnetic tape data storage drive 10, and loaded by the tape drive so that one or more magnetic read/write elements embodied on a slider body 23 of the recording system can read and write data in the form of signals with respect to the magnetic tape 14 as the tape is moved longitudinally by one or more motors 25 which rotate the reels 15, 16. Rollers 35 or other engagement mechanisms may be employed to engage the tape against a media facing surface of the slider body 23 so that the read/write elements can read and write the data to and from the magnetic tape.

The magnetic tape data storage cartridge 11 may also comprise a cartridge memory 12 which stores information about the cartridge, for example whether the cartridge has been initialized, and factory information about the cartridge, and may store housekeeping information. The magnetic tape data storage drive communicates with the cartridge memory 12 by means of a wireless communication interface 13, to read and/or write information with respect to the cartridge memory, and further communicates with the drive controller 18.

Figure 2:
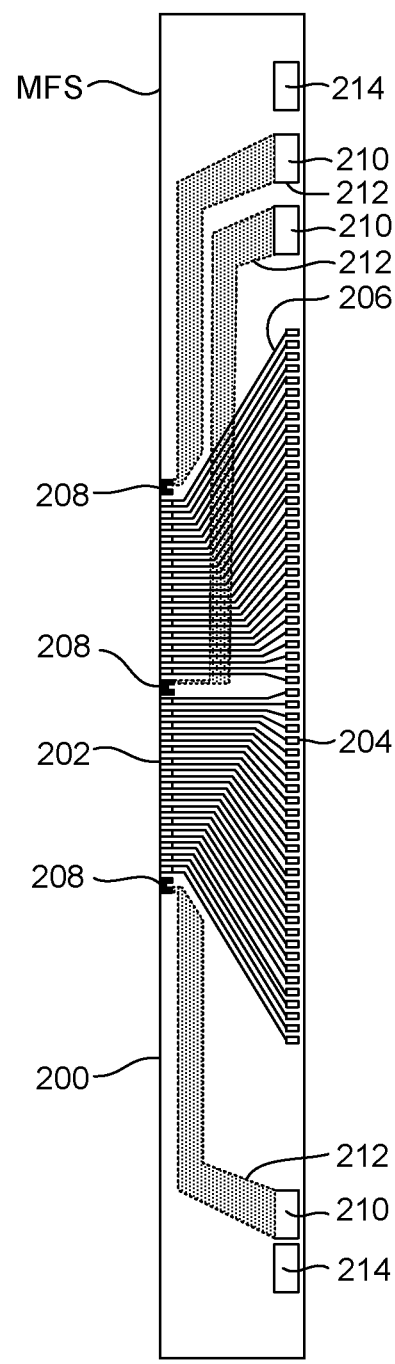
FIG. 2 is a is a top down view of a slider row-bar.

FIG. 2 illustrates a portion of a row-bar 200 that can be used to construct a slider body such as the slider body 23 of FIG. 1. The row-bar 200 can include multiple magnetic read write elements 202 formed at a side that will become a media facing surface MFS. The row-bar 200 and various read-write elements 202 formed thereon are formed on a wafer, which is later sliced into individual row-bars.

The read/write elements 202 are connected with contact pads 204 at a back side of the row-bar 200 by electrically conductive leads 206. Each magnetic read write element 202 is connected with at least two contact pads 204 by at least two electrically conductive leads 206. It should be pointed out that the row-bar 200 shown in FIG. 2 can be only a portion of an entire row-bar to be processed. The row-bar may extend lengthwise above and or below the portion shown in FIG. 2 to include one or more additional row bar elements similar to that shown in FIG. 2. After processing, these multiple row-bar elements can be separated by slicing to form multiple sliders for use in a tape drive magnetic recording system.

After the wafer has been sliced to form the row-bar 200 shown in FIG. 2, the media facing surface can be defined by a lapping process. The lapping process removes material from the surface at the left side of the row-bar 200 as shown in FIG. 2. This lapping is preferably performed in an accurately controlled manner, because the amount of material removed determines the stripe height of the read/write elements 202. The stripe height of the read/write elements is their height as measured in a direction perpendicular to the media facing surface MFS and is a critical parameter in the performance of the read/write element.

Figure 3:
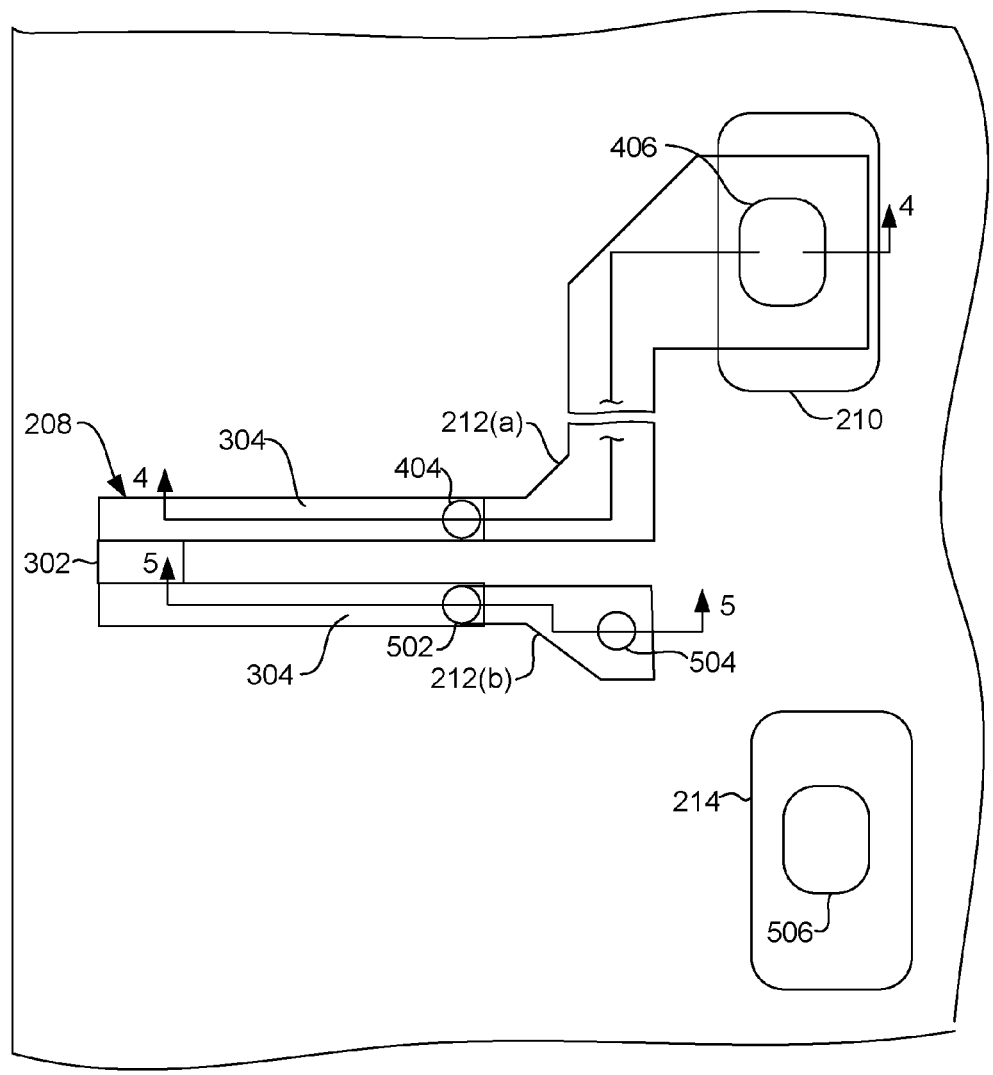
FIG. 3 is a top down view of an electrical lapping guide (ELG) and leads associated therewith.

In order to control the amount of lapping (and therefore the stripe height of the read/write elements 202) lapping guides 208 are provided on the row-bar 200. An enlarged view of a lapping guide 208 is shown in FIG. 3. As shown in FIG. 3, each lapping guide 208 can include an electrically resistive material 302 and electrically conductive leads 304 connected with opposite ends of the electrically resistive material 302. As the lapping progresses, the electrically resistive material is removed, resulting in a change in electrical resistance across the lapping guide 208. By measuring the electrical resistance across the lapping guide, the amount of progression of the lapping process can be accurately controlled.

With reference again to FIG. 2, the lapping guides 208 are electrically connected with contact pads 210 by electrically conductive lead layers 212. In the past, in order to prevent the leads 212 of the ELG 208 from physically and capacitively interfering with the leads 206 of the read/write elements 202, the ELGs 208 had to be located far away from the read/write elements 202. The leads 212 have generally been constructed at the same or nearly the same build level as the leads 206. If the leads 212, 206 are at the same level, then they will short one another out. Furthermore, if the leads 206, 212 are at nearly the same level and cross paths, there will be a capacitive coupling between the leads 206, 212. Because the leads 212 located in the vicinity of the leads 206 would have to remain in the finished slider, this capacitive coupling would interfere with the signals to and from the read write elements 202, causing unwanted signal noise. In order to prevent this, the ELGs 208 and their associated leads 212 have previously been located far away from the area of the read/write elements 202 and their associated leads 206. These ELGs and leads could be removed or sufficiently distant from the element to not interfere with element function.

However, locating the ELGs 208 far away from the location of the read/write elements 202 can result in variation in the lapping and, therefore, variations in the stripe height of the sensor. Slight variations and flexure of the row bar during lapping can cause a difference between the amount of lapping detected at the ELG and the amount of lapping actually experienced at the read/write elements. Such an arrangement would be acceptable if lapping tolerances were not too tight. As read/write elements become smaller and their stripe height dimensions become more critical, however, such an arrangement of ELGs cannot provide sufficient lapping control.

In response to this need for tighter, more accurate lapping control, FIG. 2 shows an ELG arrangement where the ELGs 208 are located in the same space as the read/write elements 202. Such an arrangement of ELGs 208 allows the lapping process to more accurately define a desired stripe height of the read/write elements 202. This placement of the ELGs 208 is made possible by a novel lead structure that prevents physical or capacitive interference between the leads 212 of the ELGs 208 and the leads 206 of the read/write elements 202. As seen in FIG. 2, there is an ELG 208 located at the center of the array of read/write elements 202, and two other ELGs 208 located at either end of the array of magnetic read/write elements 202. The stripe height of each read/write element 202 can be accurately interpolated from the lapping amount detected by the ELGs 208, thereby allowing very accurate read/write element stripe heights to be maintained. During lapping, the center ELG 208 can be monitored while the outer end ELGs 208 can be recorded to do a 3 point interpolation of the read/write element stripe heights across the array. In addition, accurate tilt control of the row-bar can be maintained by the ELGs 208 during lapping. Using this arrangement of ELGs 208, stripe heights down to at least 300 nm can be achieved. In addition, although the ELGs 208 are located close to the read write elements 202, the contact pads 210, 214 associated with the ELGs 208 can be located far away from the read/write elements 202 for convenient contact and probing during lapping.

Figure 4:
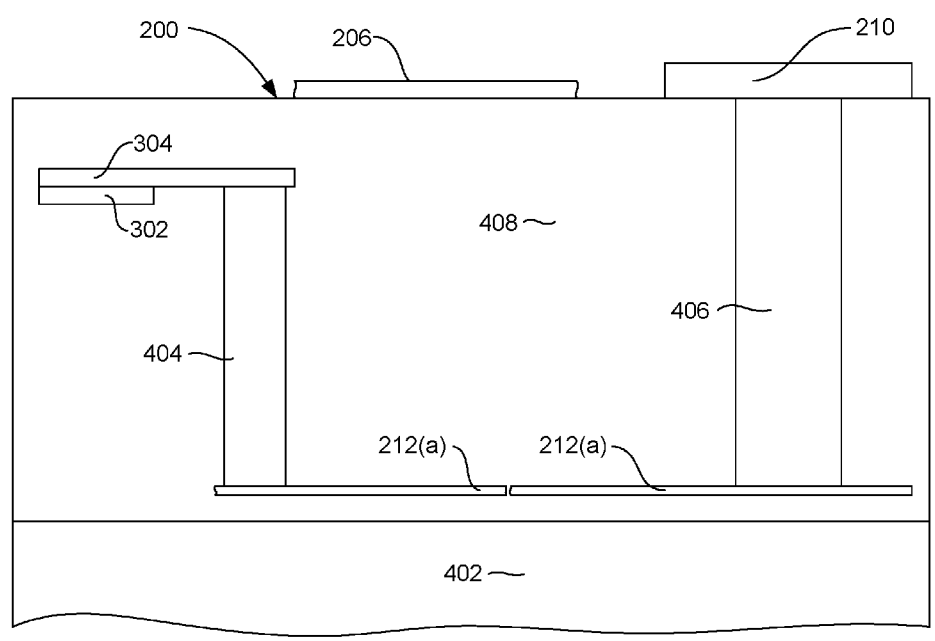
FIG. 4 is cross sectional view of the ELG and leads as taken from line 4-4 of FIG. 3.
Figure 5:
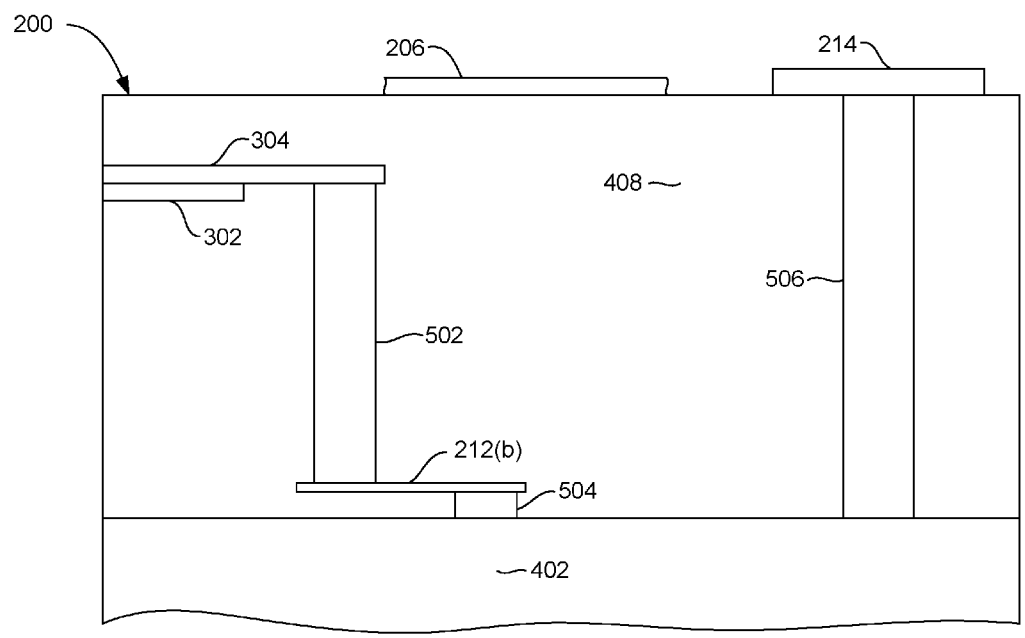
FIG. 5 is a cross sectional view of the ELG and leads as taken from line 5-5 of FIG. 3.

FIG. 3 shows a top down view of an ELG 208 and associated lead structure. FIG. 4 is a cross-sectional view as seen from line 4-4 of FIG. 3, and FIG. 5 is a cross-sectional view as seen from line 5-5 of FIG. 3. With reference to FIG. 3, the ELG 208 includes a layer of electrically resistive material 302, and electrically conductive lead pads 304 at either side of the electrically resistive material. During lapping, as the electrically resistive material 302 is removed, the electrical resistance across the electrically resistive material 302 will increase. This change in electrical resistance can be measured by applying a voltage between the lead pads 304. The lead pads 304 are connected with lead lines 212(a) and 212(b). The lead line 212(a) is electrically connected with the lead pad 210 previously described with reference to FIG. 2, and the lead line 212(b) is electrically connected with a common ground, which will described in greater detail herein below.

With reference now to FIG. 4, the structures described are formed on a substrate 402, which can be constructed of a material such as $Al_2O_3$—TiC composite and which forms the body of the slider row-bar 200 described above with reference to FIG. 2. In FIG. 4 it can be seen that the lead 304 is connected with the lead 212(a) by a via 404. The via 404 may be constructed of magnetic shield material which can be patterned and formed during the same manufacturing steps used to construct magnetic shields (not shown) of the row-bar 200. At its other end, the lead 212(a) is electrically connected with the lead pad 210 by a second via 406. Like the via 404, the via 406 can also be constructed of magnetic shield material that is patterned and formed in the same manufacturing steps used to define magnetic shields (not shown) of the row-bar 200. Therefore, the vias 404, 406 can be constructed of a material such as Ni—Fe. The area surrounding the leads 212(a) and vias 404, 406 can be filled with a non-magnetic, electrically insulating material such as alumina 408.

The vias 404, 406 allow the lead 212(a) to be buried deep in the head build. The leads 212(a) are preferably close to the substrate. Preferably, the electrical lapping guide leads 212 are no more than 1000 nanometers from the substrate 402, whereas the read/write element leads 206 (FIG. 2) are preferably at least 3000 nanometers from the substrate—leaving a minimum of 2000 nanometers between element and ELG leads.

FIG. 5 is a cross sectional view taken from the line 5-5 of FIG. 3, and shows the lead configuration for the other side of the ELG 208. The lead layer 304 is electrically connected with a via 502 that can be electrically connected with a common ground. In the embodiment shown in FIG. 5, the via 502 connects with lead line 212(b) which is electrically connected with the substrate 402 by another via 504. Alternatively, the via 502 can connect directly with the substrate. The lead pad 214 (also shown in FIG. 2) can be connected with the common ground (e.g. substrate 402) by a via 506. Again, the vias 502, 504 and 506 can be constructed of the same material and in the same manufacturing steps used to form magnetic shields (not shown) of the slider row-bar 200.

In FIGS. 4 and 5 it can be seen that the ELG leads 212(a) and 212(b) are located at a different level measured as a distance from the slider body 402 than are the read/write leads 206. Because the ELG lead lines 212(a) and 212(b) can be located close to the substrate 402, they can pass beneath the read/write element leads 206 (FIG. 2) which are generally formed near the top of the build structure (i.e. near the top of the structures shown in FIGS. 4 and 5. Because the lead layers 212(a), 212(b) are located close to the substrate, their distance of more than 2000 nm beneath the read/write element leads 206 will provide negligible additional capacitive coupling with the read/write element leads 206. It will be appreciated that a small amount of capacitive coupling inherently exists between the read/write element leads 206 and the substrate. However, since the ELG leads 212(a) 212(b) are close to the substrate, the spacing between the read/write element leads 206 and the ELG leads 212(a), 212(b) is substantially the same as the spacing between the read/write element leads 206 and the substrate 402. Therefore, the capacitive coupling between the read/write element leads 206 and the ELG leads 212(a), 212(b) will be substantially the same as the already existing, inherent capacitive coupling between the read/write element leads 206 and the substrate 402. Therefore, the presence of the ELG leads 212(a), 212(b) beneath the read/write element leads 206 will present no additional signal noise to the system. This advantageously allows the ELG leads 212(a), 212(b) to remain in the finished slider structure while also allowing the ELGs 208 (FIG. 2) to be located within the region of the read/write elements as shown in FIG. 2, thereby allowing for much more accurate stripe height control during lapping.

While various embodiments have been described above, it should be understood that they have been presented by way of example only and not limitation. Other embodiments falling within the scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A slider for data recording, comprising:
   a slider body including an electrically insulating layer formed on a substrate;
   a plurality of magnetic read/write elements formed on a top surface of the electrically insulating layer;
   a plurality of electrically conductive read/write element leads electrically connected with the plurality of read/write elements;
   an electrical lapping guide formed on the top surface of the electrically insulating layer; and
   a plurality of electrically conductive electrical lapping guide leads electrically connected with the electrical lapping guide, a portion of the plurality of electrically conductive electrical lapping guide leads buried within the electrically insulating layer.

2. The slider as in claim 1 wherein the portion of the plurality of electrically conductive electrical lapping guide leads are located closer to the slider substrate than the electrically conductive read/write elements.

3. The slider as in claim 1 wherein the plurality of read/write elements form an array of read/write elements and wherein at least a portion of the electrical lapping guide is located close to the array of read/write elements and wherein the plurality of electrically conductive electrical lapping guide leads are configured to connect the electrical lapping guide located close to the array of read/write elements to a contact location located away from the array of read/write elements.

4. The slider as in claim 3, wherein the electrical lapping guide is located within the array of read/write elements.

5. The slider as in claim 3 further comprising two additional electrical lapping guides, wherein the two additional electrical lapping guides are located at opposite ends of the read/write element array and the electrical lapping guide is located within the array of read/write elements leads.

6. The slider as in claim 2, wherein at least a portion of the electrically conductive electrical lapping guide leads are located no more than 1000 nanometers from the substrate.

7. The slider as in claim 2, wherein at least a portion of the electrically conductive electrical lapping guide leads are located no more than 1000 nanometers from the substrate and at least 2000 nanometers beneath the read/write element leads.

8. The slider as in claim 1, further comprising an electrically conductive via for electrically connecting the electrical lapping guide with the electrical lapping guide lead.

9. The slider as in claim 8, wherein the via is constructed of an electrically conductive, magnetic material.

10. A magnetic tape recording system, comprising:
    a housing;

a slider held within the housing; and a mechanism for receiving a magnetic tape and engaging the magnetic tape against the slider;

the slider further comprising:

a slider body including an electrically insulating layer formed on a substrate;

a plurality of magnetic read/write elements formed on a top surface of the electrically insulating layer;

a plurality of electrically conductive read/write element leads electrically connected with the plurality of read/write elements;

an electrical lapping guide formed on the top surface of the electrically insulating layer; and a plurality of electrically conductive electrical lapping guide leads electrically connected with the electrical lapping guide, a portion of the plurality of electrically conductive electrical lapping guide leads buried within the electrically insulating layer.

11. The magnetic tape recording system as in claim 10, wherein the portion of the plurality of electrically conductive electrical lapping guide leads are located closer to the substrate than the electrically conductive read/write elements.

12. The magnetic tape recording system as in claim 10, wherein the plurality of read/write elements form an array of read/write elements and wherein at least a portion of the electrical lapping guide is located close to the array of read/write elements and wherein the plurality of electrically conductive electrical lapping guide leads are configured to connect the electrical lapping guide located close to the array of read/write elements to a contact location located away from the array of read/write elements.

13. The magnetic tape recording system as in claim 12, wherein the electrical lapping guide is located within the array of read/write elements.

14. The magnetic tape recording system as in claim 12, further comprising two additional electrical lapping guides, wherein the two additional electrical lapping guides are located at opposite ends of the read/write element array and the electrical lapping guide is located within the array of read/write elements leads.

15. The magnetic tape recording system as in claim 11, wherein at least a portion of the electrically conductive electrical lapping guide leads are located no more than 1000 nanometers from the substrate.

16. The magnetic tape recording system as in claim 11, wherein at least a portion of the electrically conductive electrical lapping guide leads are located no more than 1000 nanometers from the substrate and at least 2000 nanometers beneath the read/write element leads.

17. The magnetic tape recording system as in claim 10, further comprising an electrically conductive via for electrically connecting the electrical lapping guide with the electrical lapping guide lead.

18. The magnetic tape recording system as in claim 17, wherein the via is formed of an electrically conductive, magnetic material.

* * * * *